Jan. 13, 1942.        G. DU RIETZ ET AL        2,270,164
MIXING APPARATUS
Filed Oct. 31, 1939         2 Sheets-Sheet 1
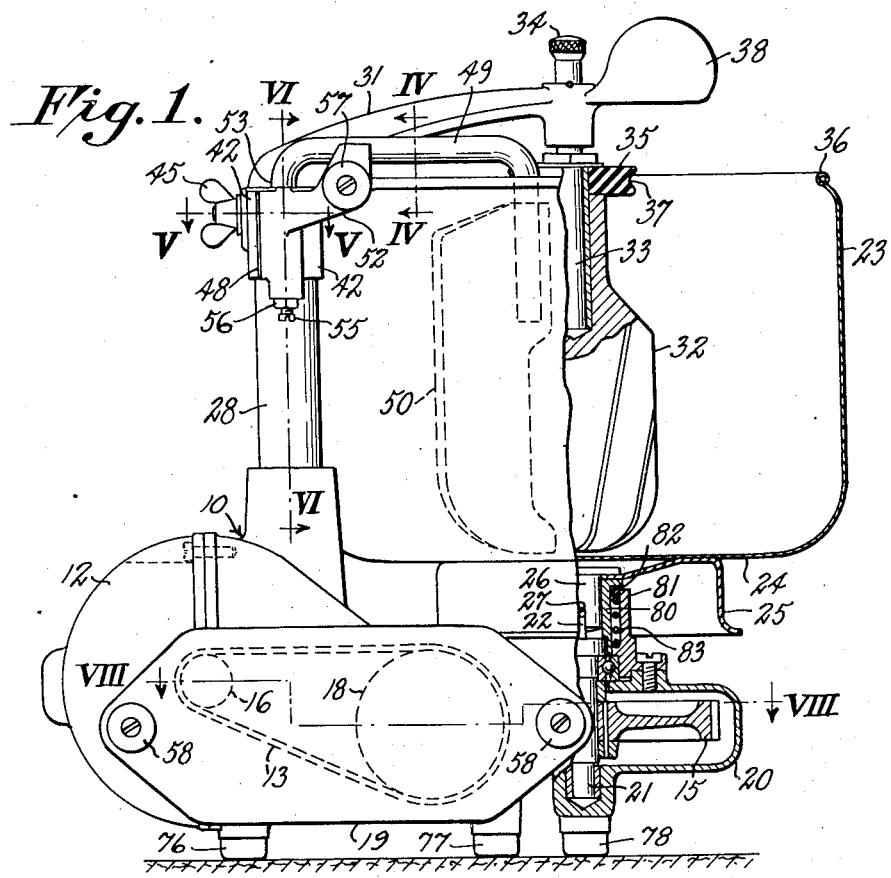
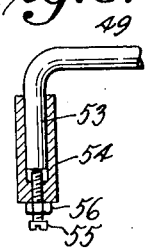 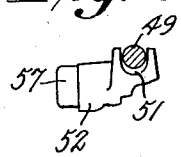 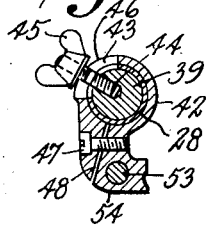 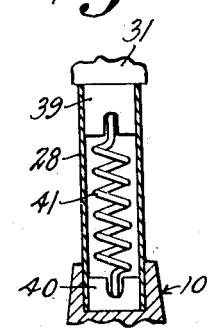
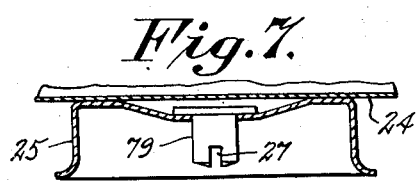

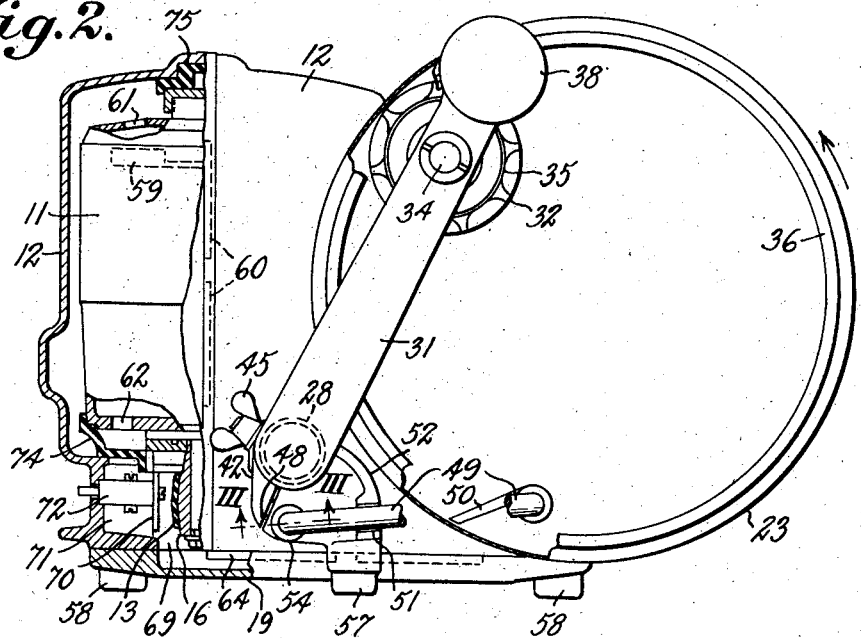
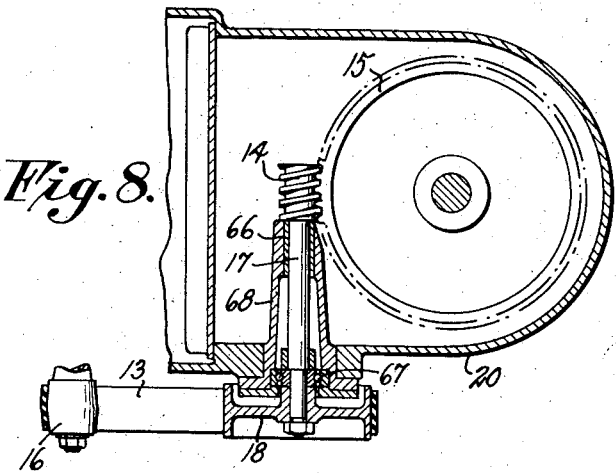
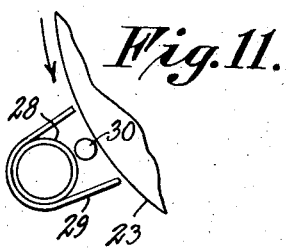
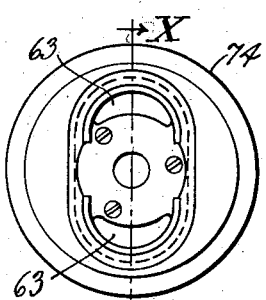
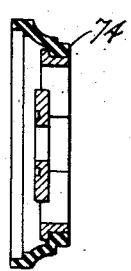
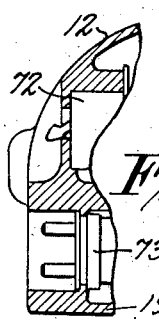

Patented Jan. 13, 1942

2,270,164

UNITED STATES PATENT OFFICE 2,270,164

MIXING APPARATUS

Gösta Du Rietz and Lars Johan Faith Ell, Stockholm, Sweden, assignors to Aktiebolaget Elektrolux, Stockholm, Sweden, a corporation of Sweden Application October 31, 1939, Serial No. 302,126
In Sweden November 1, 1938

4 Claims. (Cl. 259—85)

This invention relates to machines for kneading, crushing, mixing, churning, beating, whipping and similar operations, consisting of a rotatable container and one or several rollers or the like, resting directly or indirectly against the inner side of this container and which are to rotate around their own axes essentially parallel to the turning axis of the container when the container rotates.

In the accompanying drawings an embodiment of the invention is shown and in the following specification relating to this embodiment, the characteristic features of my invention are described.

Fig. 1 shows the apparatus as seen from the side, partly in section;

Fig. 2 shows the same apparatus as seen from above, also partly in section;

Fig. 3 is a cross-sectional view taken on the line III—III of Fig. 2;

Fig. 4 is a cross-sectional view taken on the line IV—IV of Fig. 1;

Fig. 5 is a cross-sectional view taken on the line V—V of Fig. 1;

Fig. 6 is a cross-sectional view taken on the line VI—VI of Fig. 1;

Fig. 7 is a view, partially in cross-section, illustrating a portion of the container shown in Fig. 1;

Fig. 8 is a cross-sectional view taken on the line VIII—VIII of Fig. 1;

Fig. 9 is a view of a motor support;

Fig. 10 is a cross-sectional view taken on the line X—X of Fig. 9;

Fig. 11 is a top view of a portion of the device shown in Fig. 1; and

Fig. 12 is a view, partially in cross-section, showing the location, of a switch and electrical connections.

In the drawings, 10 designates the apparatus stand, consisting essentially of a number of housings or casings enclosing the various driving members of the apparatus. The driving motor 11 of the apparatus, which is enclosed by a housing 12, transmits its motion by means of a belt 13 to a worm 14 (Fig. 8), which cooperates with a worm gear 15. The driving belt 13 runs over a pulley 16, arranged on the shaft of the motor, and over a pulley 18 mounted on the shaft 17 which carries the worm 14. The belt transmission consisting of parts 13, 16 and 18, is covered by a housing 19, while the worm 14 and the worm gear 15 are placed in a housing 20. The worm gear is firmly attached to a shaft 21, supported in the housing 20, the upper end of which is provided with a connecting member consisting, in the embodiment shown, of a non-circular (preferably rectangular) pin 22 and a sleeve 80 which surrounds the pin and is attached to the end of the shaft. The container of the apparatus, in other words the receptacle for receiving the ingredients to be acted upon, is designated by 23. Its bottom 24 is flat in the embodiment shown and is provided, on its lower side, with an inverted cup-shaped member 25, preferably arranged in the center. This member surrounds a coupling member 26, firmly connected, directly or indirectly, with the bottom 24. The lower end of this member is formed with a groove 27 intended to cooperate with the pin 22 when the member 26 is received within the sleeve 80. Sleeve 80 and member 26 may be conical in order to provide a tighter fit. The member 25 may possibly be developed as a handle for the container or serve as a connecting member for the same. The height of the coupling member 26 is equal to or less than that of member 25, as a result of which container 23, after having been removed from the apparatus, may be placed on a flat surface, for instance a table or the like, without any danger of its turning over. In order to increase the stability of the container under these conditions, the member 25 is given a comparatively large diameter.

A tubular pillar 28 is firmly connected with stand 10, and preferably extends parallel to the axis of the container 23 and directly outside of the container wall. In order to prevent objects from being wedged between the pillar 28 and the container 23, a protective plate 29 or a bolt 30 may be provided, as shown in Fig. 11. From the upper end of the pillar 28 there extends an arm 31 supported thereby in a turnable manner. Rotatably supported at the end of this arm by means of a spindle 33 is an agitator member 32.

In order to be easily removed from or inserted into the agitator, spindle 33 is provided with an easily accessible button 34. The upper end of agitator 32 is firmly connected with a roller 35, made of rubber or any other suitable material, and arranged to bear against the inturned upper edge 36 of the container 23 under certain circumstances. For this purpose the roller 35 is provided with a peripheral groove 37. Arm 31 forms at its extreme end a handle 38, by means of which the arm and consequently also the agitator 32, may be brought toward and beyond the center of the container 23. The opposite end of the arm 31 is formed with a peg 39 which is inserted in the upper end of the tubular pillar 28 and can turn in same (Fig. 5). A spring 41 is connected between the lower end of peg 39 and a part 40 secured to the lower end of pillar 28. This spring is arranged in such a manner that it always tends to turn the peg 39, and consequently arm 31, in the same direction, in the embodiment shown, counter-clockwise. Spring 41 consequently acts as a torsion spring. Around the upper end of the pillar 28 a sleeve 42, provided with a preferably axial split 48, is arranged. This sleeve is provided with a groove 43, extending about one-quarter of the periphery of the sleeve. A corresponding groove is arranged in the tubular pillar 28. A pin 44, threaded at its outer end, and firmly attached to peg 39, projects through these grooves. The swinging motion of the arm 31 is thus limited by groove 43, against the outer walls of which pin 44 will rest in its end positions. Arm 31 may be locked in any desired position by a wing nut 45, which is screwed on the outer end of the pin 44 against a preferably spiral cam 46, arranged on sleeve 42. This cam forms an oblique resting surface for nut 45, for which reason the motion of the arm is locked in only one direction, namely in the direction toward the lateral wall of the container. As a matter of fact, it is extremely important that agitator 32 can move freely towards the center of the container in case solid particles of the mass should pass between the agitator and the container walls. Sleeve 42 is attached to the pillar 28 by means of one or several screws 47 which cause the sleeve to be clamped to the pillar 28. Sleeve 42 supports an arm 49, the outer end of which extends into container 23 and carries a scraper 50. The purpose of this scraper is to remove the contents of the container from its walls. The arm 49 is guided by a groove 51 provided in a bridge 52 extending from the sleeve 42. The part 53 of the arm 49 extends at approximately right angles to the principal part of the arm and is supported in a displaceable manner in an opening of projection 54 of the sleeve 42. Arm 49 can be raised and lowered by the action of a screw 55 attached to the lower part of the projection 54 (Fig. 3). This screw may be locked by means of a locking nut 56. Due to such an adjusting possibility, deviations occurring during the manufacture, can be compensated as well as deviations resulting from the wear of the scraper. Scraper 50 may preferably be composed of wood, Bakelite or some other suitable material. The distance between scraper 50 and the container wall may be varied by unfastening sleeve 42 by slightly loosening screws 47. Arm 49 may be removed from the apparatus together with the scraper by pulling the arm member 43 through the opening in the projection 54.

On bridge 52 an appendage 57 is arranged, serving as a support for the apparatus when set on its side for instance when, instead of container 23, a meat grinder, coffee grinder, or a similar household apparatus is to be connected to the worm gear shaft 21. In addition to the appendage 57, the apparatus rests in that case on two appendages 58 arranged on the housing 19. Appendages 57 and 58 are preferably made of rubber or similar material. The appendages may be in the form of suction cups.

In this position of the apparatus the container 23 has been removed. In the other position of the apparatus, namely as shown in Fig. 1, it rests on four legs 76, 77, 78, also preferably made of rubber. Two of the legs 76 may be arranged on the lower side of the motor housing 12, the leg 77 on the lower side of the housing 19 surrounding the belt transmission, and leg 78 on the lower side of the worm gear housing 20. In order to impart to the apparatus the greatest possible stability, the stand 10 is preferably made of heavy material as, for instance, cast iron or the like. The distances between the appendages 57 and 58, and legs 76, 77 and 78, are, however, comparatively large, assuring adequate stability even if a lighter material as, for instance, aluminum or Bakelite is used. Especially the distances between appendages 57 and 58 have been made large by placing appendage 57 at a great distance from the appendages connected with the stand proper. This is necessary in order to connect a meat chopper or some other comparatively heavy additional device to the worm gear shaft 21 without running the risk of the apparatus overturning. The connection of the rotating part of the additional device is effected in the same manner as the connection of container 23, while the stationary part of the device may be connected in such a manner, for instance, that a sleeve or the like connected with the device, is placed on and screwed to a stationary support 81 surrounding the sleeve 80 and connected with the worm gear housing 20. In the upper part of the intermediate space between the sleeve 80 and the support 81 a tightening ring 82 of felt or the like is inserted, which is pressed by a spring 83 against a flange protruding from the uppermost part of the sleeve 80. The felt ring serves as a tightening member for the worm gear and its support and prevents splashing water and the like from penetrating into it.

The carbon brushes of the motor 11 are preferably disposed at the intersection of planes parallel to the plane of legs 76, 77 and 78 and to the plane of appendages 57 and 58, respectively, whereby the brushes are horizontal in either position of the apparatus.

The driving motor 11 is provided with a ventilating fan 59 intended to draw cold air through the channel 60 into the motor housing 12 and through openings 61 into the cap of a bearing of the motor. The air flows through corresponding openings 62 into the other bearing cap and further through openings 63 (Fig. 9) into the housing surrounding the belt transmission. This air is discharged through opening 64 in the housing 19. By means of this air current not only the driving motor but also the belt is cooled, in addition to which the air also passes the inner wall of the worm gear housing 20.

The pulley 18 is so dimensioned with respect to the pulley 16 that the worm 14, connected with the pulley, will rotate at a speed corresponding to a value ranging between one-half and one-fifth of the speed of the motor. Thus the principal reduction of the speed in the motor takes place in the worm gear. Its housing 20 is preferably filled with oil or grease. The worm 14, as appears from the drawing, is supported on one side only by means of two bearings, 66 and 67, due to which the worm 14 and both these bearings, with the bearing seat 68, form a demountable unit.

All ventilation openings in the housing and casings of the stand are developed in the form of slits, arranged on the lower side of the stand, so that splashing water or the like cannot penetrate into the driving members of the apparatus. The space in which the belt transmission is arranged is divided by a partition 70 into a separate chamber 71 in which the electric switch 72 and the plug receptacle 73 are arranged. The driving motor 11 is connected with its housing 12 contained in the stand 10 in such a manner that a special protecting insulation is provided between the parts 11 and 12. This insulation consists of a sleeve 74 and a ring 75 preferably made of rubber or similar elastic, and electrically-insulating, material. The rubber sleeve 74 is developed as a funnel and intended to convey the cooling air for the driving members. The pulling strain on the pulley 16 caused by the belt 13 is received by the rubber sleeve 74. Due to the fact that the driving motor 11 is thus elastically connected with the stand of the apparatus, vibrations from the motor are prevented as far as possible from being transmitted to the stand. Due to the fact that belt 13 is preferably made of rubber, the pulley 18 is also electrically insulated from the motor. Insulation may also be provided by making the pulley 18 of dielectric material, for instance, Bakelite.

As machines of this kind are subjected to very different loads, for instance, when they are combined with a meat grinder, it is advisable to arrange an overload protection for the motor. This consists in the present case, for instance, therein that the belt is dimensioned in such a manner that in case of a heavy load it tends to slide off the pulley 16. In order to enable the belt to slide off the pulley 16 when the driving members are loaded too heavily, the space 69 has been widened externally. Other overload protecting devices as, for instance, sliding connections and the like, are, of course, also possible.

The scraper arranged in the container may be provided on the side opposite the inside of the container, with a recess which is preferably located in the front part of the scraper, namely, the part facing the moving direction of the container. Under certain circumstances the scraper may be entirely in the shape of a shovel or possibly resemble a plough-share, in order to prevent the contents of the container from adhering to the scraper.

What we claim is:

1. In an apparatus of the class described, a frame including a base and an arm extending substantially at right angles thereto, a container rotatably mounted on said base, means for rotating said container, an agitator within said container, means for rotatably supporting said agitator from said arm, a member having substantially parallel portions, one of said portions being rotatably supported by said arm and another portion extending into said container, and a scraper carried by the latter portion for contacting the interior of said container.

2. In an apparatus of the class described, a frame including a base and an arm extending substantially at right angles thereto, a container rotatably mounted on said base, means for rotating said container, an agitator within said container, means for rotatably supporting said agitator from said arm, a member having parallel vertical legs connected by a horizontal portion, one of said legs being rotatably and removably supported by said arm and the other leg extending into said container, and a scraper carried by said other leg for contacting the interior of said container, said arm being formed with a horizontal groove for receiving the horizontal portion of said member for preventing rotation thereof.

3. In an apparatus of the class described, a frame including a base and an arm extending substantially at right angles thereto, a container rotatably mounted on said base, means for rotating said container, an agitator within said container, a member swingably mounted on said arm for swingably and rotatably supporting said agitator within said container, means carried by said arm for limiting the swinging movement of said agitator towards the side wall of said container, a member having substantially parallel portions, one of said portions being rotatably supported by said arm and another portion extending into said container, and a scraper carried by the latter portion for contacting the interior of said container.

4. In an apparatus of the class described, a frame including a base and an arm extending substantially at right angles thereto, a container rotatably mounted on said base, means for rotating said container, an agitator within said container, a member swingably mounted on said arm for swingably and rotatably supporting said agitator within said container, a spiral cam on said arm, an adjustable stop element carried by said member and cooperating with said cam to adjustably limit the swinging movement of said agitator towards the side wall of said container, a member having substantially parallel portions, one of said portions being rotatably supported by said arm and another portion extending into said container, and a scraper carried by the latter portion for contacting the interior of said container.

GÖSTA DU RIETZ.
LARS JOHAN FAITH ELL.